United States Patent

Lennie et al.

Patent Number: 6,092,213
Date of Patent: Jul. 18, 2000

[54] FAULT TOLERANT METHOD OF MAINTAINING AND DISTRIBUTING CONFIGURATION INFORMATION IN A DISTRIBUTED PROCESSING SYSTEM

[75] Inventors: Robert Lennie, Sunnyvale; Charles S. Johnson, San Jose, both of Calif.

[73] Assignee: Tandem Computers Incorporated, Cupertino, Calif.

[21] Appl. No.: 08/941,478

[22] Filed: Sep. 30, 1997

[51] Int. Cl.$^7$ ........................................ G06F 11/00
[52] U.S. Cl. ........................................ 714/3
[58] Field of Search ........................ 370/220, 226, 370/392; 714/3, 4, 10, 11, 7, 5, 6, 19, 18; 707/10, 2

[56] References Cited

U.S. PATENT DOCUMENTS

| | | | |
|---|---|---|---|
| 4,817,091 | 3/1989 | Katzman et al. | 714/815 |
| 5,574,849 | 11/1996 | Sonnier et al. | 714/3 |
| 5,796,934 | 8/1998 | Bhanot et al. | 714/4 |
| 5,883,939 | 3/1999 | Friedman et al. | 714/2 |
| 5,909,540 | 6/1999 | Carter et al. | 714/4 |
| 5,924,096 | 7/1999 | Draper et al. | 707/10 |

FOREIGN PATENT DOCUMENTS

| | | | |
|---|---|---|---|
| 0723227 A2 | 7/1996 | European Pat. Off. | G06F 11/20 |
| 0772126 A2 | 5/1997 | European Pat. Off. | G06F 11/00 |

*Primary Examiner*—Robert W. Beausoliel, Jr.
*Assistant Examiner*—Pierre E. Elisca
*Attorney, Agent, or Firm*—Townsend and Townsend and Crew LLP

[57] ABSTRACT

A computing system in the form of a cluster of a number of multiprocessing nodes maintains, in a fault tolerant manner, a distribution of configuration data for each of the nodes so that each node has a database containing the configuration data associated with that node. The database, and therefore, the configuration data it contains, associated with any one node is substantially identical to that of any other node. A process running on one of the nodes is responsible for receiving a requests that require modification of the configuration data. Effecting changes to the configuration data, and therefore the distributed databases, includes the steps of first writing the requested change to a master audit log, distributing the change request to all nodes, receiving back from the nodes acknowledgement of the change request being effected at the acknowledging node, and then writing again to the master audit log that the change has been effected throughout the system. The master audit log thereby contains a reliable copy of the configuration data maintained in the database associated with each node of the cluster so that in the event any of the configuration data becomes corrupted, it can be replaced with correct data from the master audit log.

6 Claims, 3 Drawing Sheets

FAULT TOLERANT METHOD OF MAINTAINING AND DISTRIBUTING CONFIGURATION INFORMATION IN A DISTRIBUTED PROCESSING SYSTEM

BACKGROUND OF THE INVENTION

The present invention relates to computing systems of a type in which multiple processor units are arranged as a cluster of communicatively interconnected nodes, each node comprising one or more processor units. In particular, the invention relates to maintaining and distributing to each node configuration data identifying particular characteristics of the cluster and its elements in a fault tolerant manner.

In today's industry, there are certain computing environments, such as stock exchanges, banks, telecommunications companies, and other mission critical applications, that do not tolerate well even momentary loss of computing facilities. For this reason such environments have, for many years, relied on fault tolerant and highly available computer systems. The architectures of such systems range from simple hot-standby arrangements (i.e., a back-up computer system stands ready to take over the tasks of a primary computer system should it fail) to complex architectures which employ dedicated (and replicated) portions of the computing hardware. These latter systems may be most effective in providing continuous availability, since they have been designed with the goal of surviving any single point of hardware failure, but suffer a price premium due to the increased component cost needed for component replication. But, even with component replication, the architecture is still susceptible to a single point of failure: the operating system. One approach to the problem of a single operating system is to employ a distributed operating system.

Distributed operating systems allow collections of independent machines, referred to as nodes, to be connected by a communication interconnect, forming a "cluster" which can operate as a single system or as a collection of independent processing resources. Fault tolerance can be provided by incorporating hardware fault detect with the distribution of the operating system in the cluster. High availability is achieved by distributing the system services and providing for takes of a failed node by a backup node. With this approach, the system as a whole can still function even with the loss of one or more of the nodes that make up the cluster. Therefore, the operating system will no longer be a single point of failure. Since the operating system is providing the high availability and fault tolerance, it is no longer necessary to incorporate replicated hardware components to the extent previously used, although their use is not precluded. This can alleviate the price premium of fault tolerant hardware.

Recently, the clustering concept has been extended to computing architectures in which groups of individual processor units form the nodes of the cluster. This approach allows each node, having two or more processor units to operate as a symmetric multiprocessing (SMP) system capable of exploiting the power of multiple processor units through distribution of the operating system and thereby balance the system load of the SMP node. In addition, it may be possible for an SMP configured node to reduce downtime because the operating system of the node can continue to run on remaining processors in the event of failure of one processor.

However, in order to employ multiple SMP nodes in a cluster, and have them able to operate efficiently as a single processing environment, there should be available configuration data that provides a description of the cluster. That description will provide, for example, information such as to how many nodes make up the cluster, the composition of each node, the address of each processor unit of a node, the processes running on or available to the node(s), the users of the cluster and their preferences, and the like. Further, this configuration data should remain consistent, accurate and continuously updated across the cluster members, and herein is introduced areas of attack on the fault tolerant and high availability aspects of the cluster. Improper retention and/or distribution of the configuration data can leave it vulnerable to corruption by viruses, hackers, or even inadvertent, but well-meaning, corruption by a system administrator who makes an erroneous change. In addition, the configuration data should remain consistent across all nodes to allow all cluster members to agree e.g., as to what nodes (and the processor units they contain) are located where. Changes to the configuration data used by one node should also be made to the configuration data of the other nodes. Thus, distribution of such changes must be resistant to faults.

As reliance on computer systems continues to permeate our society, and as more services move on-line, twenty-four by seven operation and accessibility will become critical. Therefore, fault tolerance and high availability are, and will continue to become exceedingly important. Being able to offer the same level of fault tolerance and high availability in software via clustering, as can be achieved with fault tolerant hardware, will be very attractive. Highly available, fault tolerant, and scalable systems will then be able to be created from commodity components and still achieve the same level of reliability and performance as much more costly dedicated fault tolerant (FT) hardware.

SUMMARY OF THE INVENTION

The present invention provides a method of maintaining a consistent database of configuration data across the interconnected nodes of a cluster so that the configuration data remains highly reliable and available in the face of all but the most disastrous attacks. Changes to the configuration data, and distribution of those changes, are handled in a fault tolerant manner so that the configuration data accessible to one node is substantially identical to that of any other node.

According to the present invention, each of a number of multiprocessor nodes of a computing system cluster is provided a database or "registry" for containing configuration data. One of the nodes functions as the residence of a primary process which, among other things not relevant here, has the responsibility of receiving all requests that require a change to the configuration data in the registry of any of the nodes, and therefore the registries of all the nodes. The primary process maintains a master audit log on a disk storage that is "mirrored." (I.e., an identical copy of the content of the audit log is kept on a second disk storage unit.) Thus, all requests for a change of the configuration data maintained in the registry received by the cluster are routed to the primary process. When a request for registry change is received by the primary process, information concerning the request is first written to the master audit log and mirror audit log. Then, the primary process prepares a message containing request data and sends the message to a monitor process running on each node (including that node at which the primary process resides). Each monitor process is responsible for maintaining and providing access to the registry. Upon receipt of the request data, each monitor process will access the associated registry of that node to make the indicated change and report back to the primary process that the change of the request was accomplished. Upon receipt by the primary process receives change reports from all nodes of the cluster, it will write to the master audit log (and mirror audit log) that the requested change is complete. Thereby, all changes to the registry are maintained in the audit log so that a complete copy of the registry is kept by the audit log.

In a further embodiment of the invention, nodes of the cluster may be configured to implement the "process pair" technique described in U.S. Pat. No. 4,817,091. According to this embodiment of the invention, a process of any node can have a backup process on another node somewhere else in the cluster. Failure of the process will result in its backup process in taking over the tasks of the failed process. To ensure that the backup process is able to pick up from as near to the point of failure as possible, "checkpoint" data is sent by a process to its backup so that the backup is kept up-to-date as to the activity of the process it is backing up. These checkpoints are made for significant events (those events that are important to a takeover), or more often if desired.

This process pair technique is employed in connection with the primary process. Thus, when the primary process receives a request to change the configuration data contained in the registry, an indication of that change is "checkpointed" to a backup process for the primary process—before the indication of the request is written to the master audit trail. Should the primary process fail before the change to the configuration data of the registry is complete, the backup process can either complete the change, depending upon where in the operation the failure occurred, or back out of the operation in favor of beginning over again.

It will be apparent to those skilled in this art that the present invention has a number of advantages. Configuration data may now be maintained safe from corruption, and distributed in a fault tolerant, reliable manner. Corruption of any registry of any one node (or even all nodes) can be corrected using the content of the master audit log. In addition, the mater audit log is kept updated in a manner that ensures the configuration data's credibility and reliability.

These and other features, aspects, and advantages will become apparent upon a reading of the detailed description of the invention, which should be taken in conjunction with the accompanying drawing.

DESCRIPTION OF THE PREFERRED EMBODIMENT

Figure 1:
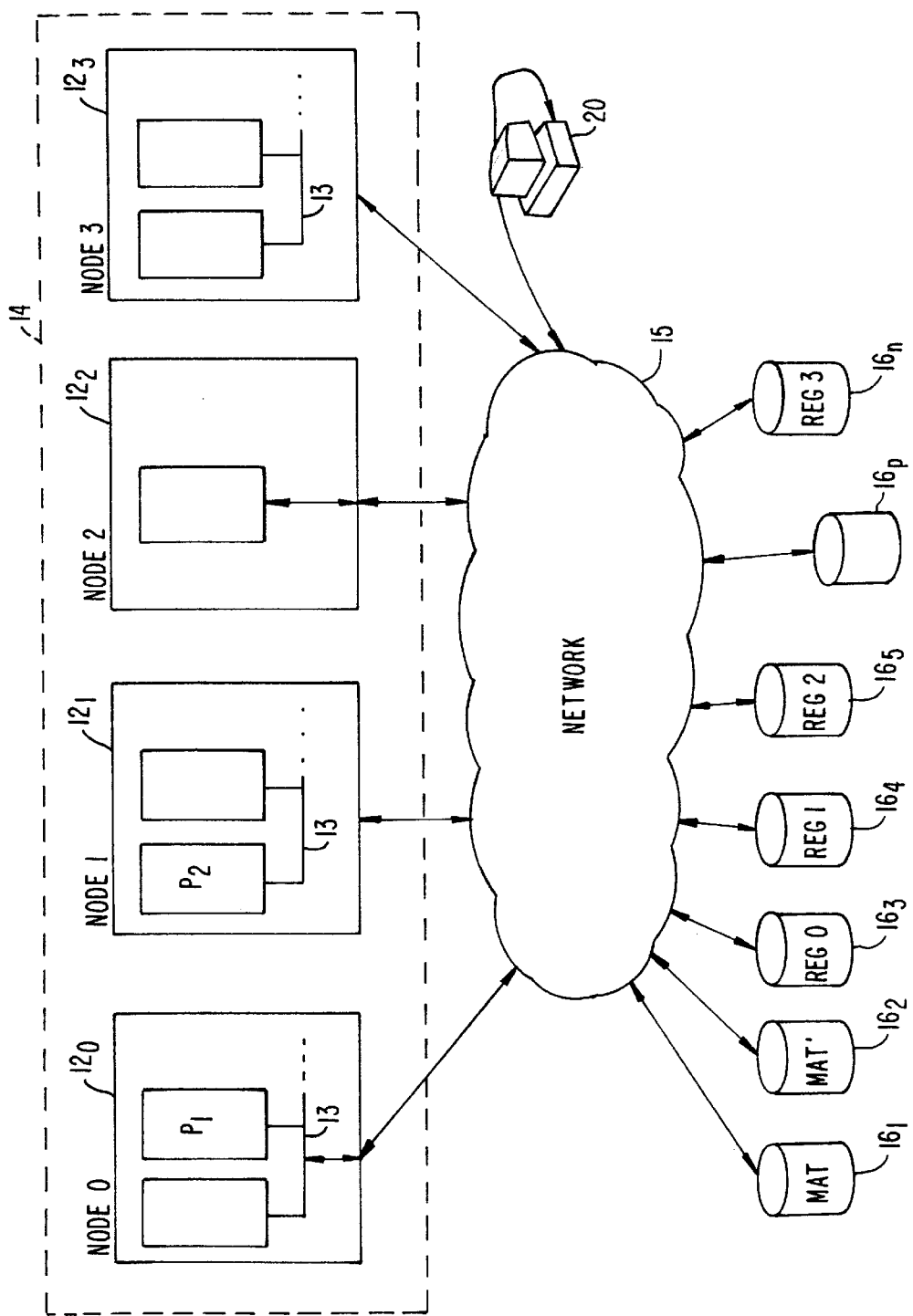
FIG. 1 is simplified block diagram illustration of computing system architecture in the form of a four node cluster.

Referring now to the Figures, and for the moment specifically to FIG. 1, there is illustrated a computing system, generally designated with the reference numeral 10, comprising a number (four) of processing nodes 12 (node 0, node 1, ..., node 3) that form a cluster 14. Each processing node 12, in turn, may comprise one or more processor units P. Thus, as FIG. 1 illustrates, node 0, node 1, and node 3 comprise two or more processor units P. Node 2, on the other hand, includes only one. This is for illustrative purposes only, and how many processor units P are used to make up any one node 12 of a cluster is not relevant to the employment of the present invention, although a limit of 8 processor units P for each node may be sufficient. (The cluster 14, on the other hand, may include up to 128 nodes 12.)

The limitation of 8 processor units P per node 12 results from the symmetric multiprocessing operating system used for the nodes: Windows NT, which is available from Microsoft Corporation, One Microsoft Way, Redmond, Wash. (Windows and Windows NT are trademarks of Microsoft Corporation). Future editions of the Windows NT operating system, or other operating systems, may allow increased numbers of processor units to be included in each node.

The nodes are communicatively connected to one another, and to a number of storage elements 16 ($16_1$, $16_2$, ..., $16_n$) here represented as disk storage, by a data communication network 15. The communication network 15 preferably is that disclosed in U.S. Pat. No. 5,574,849, the disclosure of which is incorporated by reference to the extent necessary.

In order for each processor unit P to keep information concerning its own configuration (the processes it runs, any special information concerning those processes, special needs of users of those processes), as well as information needed by each of the nodes 12, each node will maintain configuration data in a registry that is kept, for each node, on disk storage. Thus, the registries for node 0, node 1, ..., node 3 are respectively kept on storage units $16_3$, $16_4$, $16_5$, and $16_n$, respectively. Each node will have a monitor (MON) process (FIG. 2) whose responsibility is, among other things not relevant here, to access and maintain the registry. Changes and modifications to the respective registries are effected by configuration messages that are sent by a central or primary process to all MON processes, as discussed further below. According to the present invention, all registries are maintained by the respective MON processes of the associated nodes so that they (the registries) are identical.

The system 10 typically can include a number of work stations, or other user (or other) input apparatus, from which transaction requests may be received and responded to as necessary. (As used here, a transaction is an explicitly delimited operation, or set of related operations.) The work station 20 is meant to represent such input apparatus.

One of the nodes 12, for example node 0, is chosen as to the residence node of a primary process with the responsibility of keeping track of the transactions received by the system 10, where they are being handle, and when the transaction is compete. Transaction monitoring is used to ensure that the transaction completes, or if it does not complete (e.g., because the node/processor/process operating on the transaction fails), the process will either attempt to complete the transaction, or backup out to a point where the transaction can be restarted (e.g., on another node/processor/process, as the case may be) in an effort to complete. This primary process (hereinafter "Primary Transaction Monitoring Process," or "P-TMP") is also assigned the responsibility of receiving all indications ("requests") that will require a change to the registries of the system 10. (For example, registry changes may be necessitated by addition or removal of nodes to or from the system 10, or changes in other configuration aspects.) This helps ensure that the configuration data contained in the registries associated with all nodes 12 remains consistent and substantially identical for those reasons stated above. In addition, the P-TMP will also be responsible for keeping a copy of the configuration data in a safe repository, here a master audit log or master audit log ("MAT") that is retained by disk storage unit $16_1$. Of course, the master audit log may also keep other important information that, like the configuration data, needs to be copied so that in the event such information is corrupted, lost, or otherwise rendered suspect, it can be recreated and replaced from the copy. (A discussion of an audit log may be found in U.S. Pat. No. 5,590,275.) A mirrored copy of the MAT, MAT', is kept on a separate storage facility: disk storage unit $16_2$.

Figure 2:
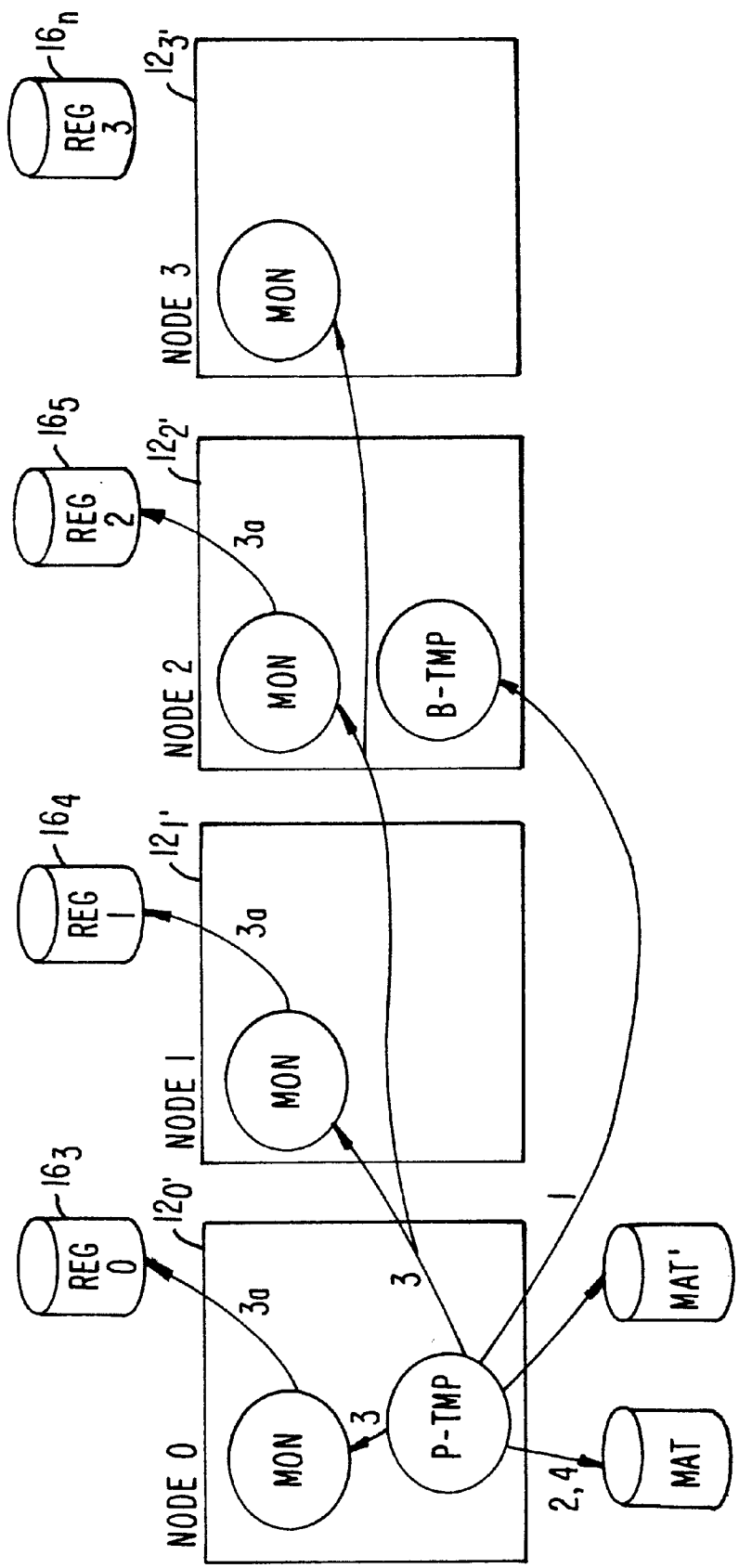
FIG. 2 is a conceptual illustration of the cluster of FIG. 1 to show the steps taken by the present invention.
Figure 3:
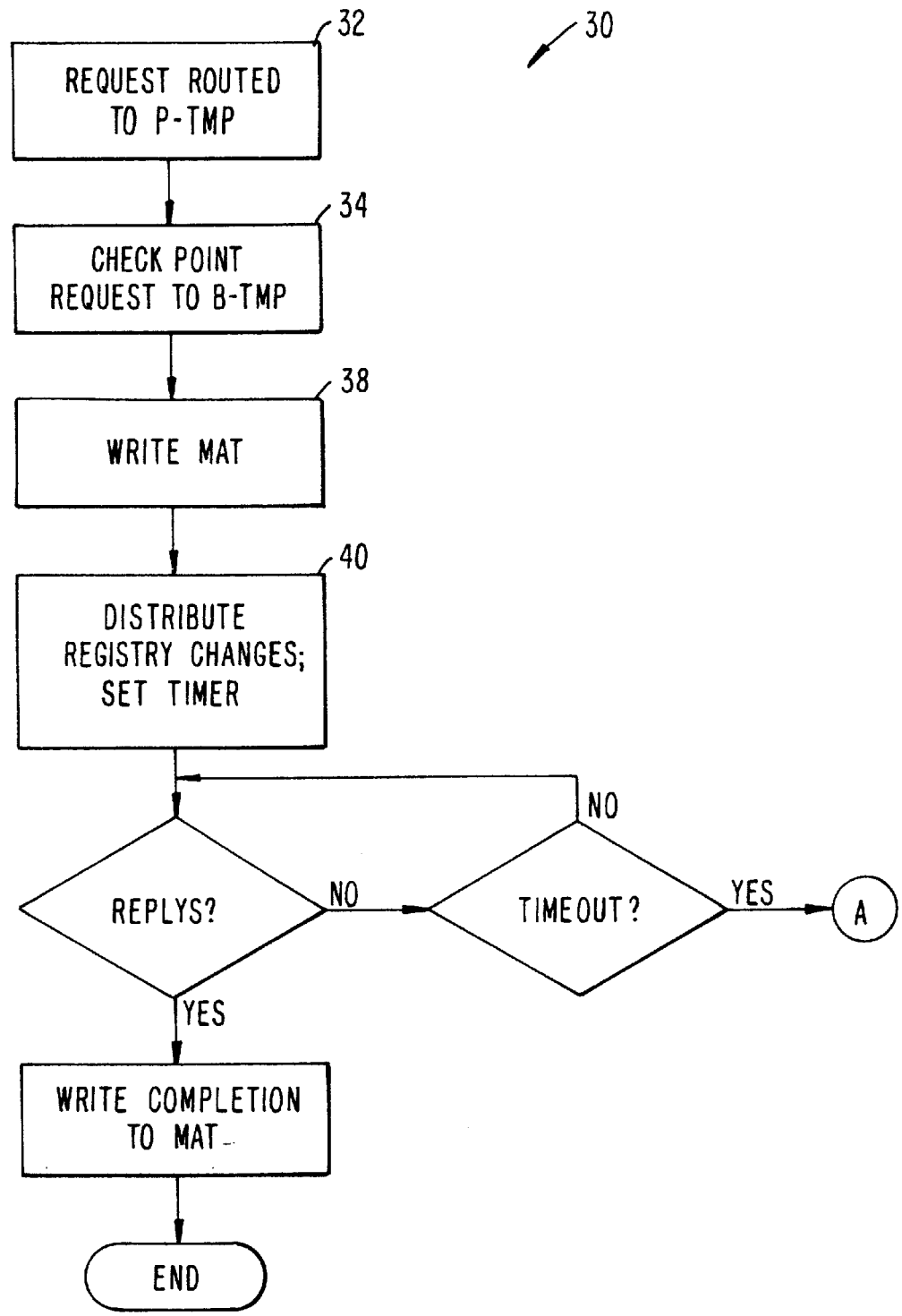
FIG. 3 is a flow diagram illustration, showing the steps taken by the present invention to maintain a safe and reliable copy of the registry, and to distribute changes to the registry to the nodes of the cluster of FIG. 1 in a fault tolerant manner.

Turning now to FIG. 2, the nodes of the system 10 (FIG. 1) are shown in a conceptual form to represent the processes used for the present invention, and their interrelation to implement the invention. FIG. 3 broadly illustrates, in flow diagram form, the operations of the invention.

Referring first, however, to FIG. 2, shown, as indicated above the P-TMP installed and running on the SMP environment provided by the processor units P of node 0. Its backup, B-TMP, is installed on node 2, although any other node (except, preferably, node 0) may be used to accommodate B-TMP. In addition, the monitor process (MON) is installed on each of the nodes 12 which, among its various tasks, is the responsibility of accessing, maintaining, and modifying the registry for the (REG) associated node 12.

FIG. 3 diagrammatically illustrates the steps taken to modify the registry associated with each of the nodes. It will be appreciated, that the actual communication between processor units P (not shown in FIG. 2) of each node 12 is via an internal data buss 13. And, communication between a process operating on that node (e.g., one of the processor units P) and any other process in the system 10, or the storage elements 16, will be conducted with the aegis of the communications network 15. Thus, for example, the P-TMP is shown with communication paths to the disk storage units $16_1$, and $16_2$ whereat the MAT and its mirror, MAT', are kept. In addition, the communications network 15 provides the medium for allowing the P-TMP to communicate with B-TMP on node 2, or the MON processes of the nodes 12. Similarly, the MON processes of each node 12 communicate with their associated registry (REG) also through the communications network 15. Preferably, the communications network 15 will take the form of that shown in U.S. Pat. No. 5,574,849, although those skilled in this art will readily see that other forms of communication networks may be used.

Referring now to FIG. 3, and taking it in conjunction with FIG. 2, the steps for updating the configuration data maintained by the registries REG will now be described. Assume that the system 10 receives an indication that the configuration of that system changes. For example, a new user logs onto the system 10 from the workstation 20 (FIG. 1) to use a process installed on node 3. The presence of a new user, and the process(es) that will be employed by that user, and other information, are matters pertaining to the configuration of the system, and kept in the configuration data of the system registry (i.e., the registries maintained by each node 12). The configuration data maintained by the registries must be updated to account for the new user, the workstation being used, the process(es) invoked, and any other additional information needed by the nodes 12. The particulars concerning the new user will be routed to the P-TMP as shown by the flow diagram 30 at step 32.

When the information is received by the P-TMP (step 32), it will first transmit a communication to the B-TMP (step 34) on node 2 with information indicative of the fact that a change of the configuration data has been, in effect, requested together with the required information. The reason for this is that if the P-TMP fails during the change operation, the B-TMP, using the information concerning the change, can either continue the change operation until completion, or back it up and start over, when it takes over for the failed P-TMP.

Next, after the "checkpoint" operation to B-TMP, step 38 sees the P-TMP writing the indication of configuration data change to the MAT. The process (a disk process) that writes the information to the MAT will also write that same information to the mirrored volume retaining the MAT'. If P-TMP fails, and the B-TMP is required to take over, B-TMP can retrieve information from the MAT in order to determine how best to proceed with the change (i.e., to continue, or to back-out).

The P-TMP continues at step 40 by distributing the registry changes to each of the MON's of each of the nodes, including the node 0 on which P-TMP is mounted. A software timer is then set by the P-TMP, and after the registry change requests are sent to the MONs (step 40), the P-TMP will wait for acknowledgements that the change request was received by each of the MONs. In the event any particular MON process encounters an error in attempting to write its associated registry REG, the MON process will issue a "poison pill" message to the processors of that particular node to shut the node down so that no data errors are propagated from the node to the rest of the nodes of the cluster.

Preferably, the system 10 utilizes a form of the "I'm alive" concept in which each node periodically transmits to all other nodes a message indicative of that node's continuing good health. If an I'm Alive message is not received from a node, by the remaining nodes, that node is considered to have failed, or have been removed, and the P-TMP will be informed accordingly so that it can formulate a registry modification that will indicate the absence of the failed/removed node. (The absence of an I'm Alive message from a node will be noted; by those backup processes, if any, that have or had associated primary processes on the failed node. The lack of an I'm Alive message will prompt those backup processes to spring into action to take over the tasks of the corresponding primary processes that were on the now-silent node.) That registry modification is then checkpointed to the B-TMP (assuming that it is not the failed node), written to the MAT (and the mirror MAT, MAT'), and distributed to the nodes remaining in the system, in the manner described above.

In an embodiment of this invention, each of the nodes 12 will have installed and running a cluster manager (CM) process (not shown) responsible for keeping track of what nodes are in the system, what processor units are in what nodes, etc. There is a CM on each node continually communicating with the CMs of the other nodes, and all communications sent require a reply. In view of this frequency of messaging between all nodes, it is believed unnecessary to add to the communication traffic carried by the network 15. Thus, when the CM of any node 12 realizes that it has not heard from the CM of any other node (e.g., node $12_2$, FIG. 1) within a predetermined period of time, it will declare that node "dead," and communicate that declaration to the remaining nodes (i.e., their CMs). This achieves the same result as the "I'm Alive" transmissions, but at less expense to overall system and node performance.

What is claimed is:

1. A method of maintaining a consistent, fault tolerant database of configuration data in each of a number of processor units communicatively intercoupled to form a multiple processor system, each of the number of processor units maintaining a copy of the database configuration data that is a substantial copy of the database of configuration data maintained by each of the other of the number of processor units, including the steps of:

receiving a request to modify the database at a one of the number of processor units;

the one processor unit operating to write the information corresponding to the request data to a master audit trail file, send a modify message corresponding to the request to the number of processor units, including itself, each of the number of processor units sending an acknowledgment message to the one processor unit that the modification as indicated in the modify message is made, and upon receiving acknowledgments from all the processor units, making permanent in a master log information indicative of the change.

2. The method of claim 1, wherein another of the number of processor units serves as a backup processor, and including the step of the one processor unit operating to send a data message to the backup processor unit with information corresponding to the request data.

3. The method of claim 2, wherein the step of operating to send a data message to the backup processor unit occurs before the step of operating to write the information.

4. In a multiple processor system of a type including a communicatively intercoupled number of processor nodes, each processor node comprising one or more processor units interconnected to form a symmetric multiple processing system, each of the processor nodes having associated therewith configuration data that is a substantial copy of the configuration data associated with each of the other of the processor nodes, the multiple processor system from time to time receiving requests that require changes to the configuration data, a method of keeping consistent the configuration data associated with each of the number of processor nodes, including the steps of:

providing each of the number of processor nodes with a monitor process responsible for maintaining configuration data associated with such node;

designating a one of the number of processor nodes to give residence to a primary process operating to, (a) receive the requests requiring a change or modification of the configuration data, (b) write an indication of the change of each received request to a master log, (c) send a data message for each received request to each of the monitor processes indicative of the change to the configurations data;

each of the monitor processes receiving the data message to effect changes in the configuration data contained in the associated database of configuration data and sending an acknowledgment to the primary process message that the change to the database of configuration data is complete; and writing an indication to the master log that the change is complete if all monitor processes respond with an acknowledgment.

5. A method of maintaining a consistent, fault tolerant database by a multiple processor system that includes a number of processor units, including a first processor unit, communicatively intercoupled to one another, the first processor operating to maintain a master database, the other of the number of processor units operating to maintain substantially identical copies of the master database, the method including the steps of:

receiving at the first processor unit a request to modify the database;

the one processor unit operating to (a) write information corresponding to the request data to a master audit trail file, (b) send a modify message corresponding to the request to the other of the number of processor units;

each of the other of the number of processor units receiving the modify message to (c) perform a modification to the associated database as indicated in the modify message, and (d) reply to the modify message to inform the one of the number of processor unit that the modify message was received.

6. A multiple processor system, comprising:

a number processor nodes communicatively intercoupled to one another, each of the processor including, one or more processor units in a symmetrical multi-processing configuration, a configuration database, the configuration database of each processor node being substantially identical to the configuration database of each co the other processor nodes, a monitor process operable to maintain and make changes to such configuration database;

the one of the processor units having a primary process operating to receive a request for a change to the configuration database associated with each of the number of processor nodes and to write an indication of the change to a master log, send a data message to each of the monitor processes to effect a change to the associated configuration database;

receive from each of the monitor processes an acknowledgment that the change to the corresponding configuration database is complete, and complete the write of the indication of the change to the master log.

\* \* \* \* \*